3,193,470
MALTING PROCESSES INVOLVING TREATMENT WITH A GIBBERELLIC ACID PRODUCT

Alan Macey and Keith C. Stowell, Newark-on-Trent, England, assignors to Associated British Maltsters Limited, Newark-on-Trent, England, a British company
No Drawing. Filed Aug. 12, 1963, Ser. No. 301,621
Claims priority, application Great Britain, May 16, 1960, 17,238/60
13 Claims. (Cl. 195—71)

This is a continuation-in-part of application Serial No. 109,884 (filed May 15, 1961), now abandoned.

This invention concerns the malting of cereal grains and relates especially to the malting of barley.

In the production of malt from barley the grain is first steeped in water and thereafter the grain is spaced in boxes or drums or spread on a floor (the operation known as flooring) where it germinates. The germination period extends from about six to ten days depending on various conditions and during germination the grain respires and heat is produced. When germination has proceeded to a required extent the grain is kilned to arrest germination and impart particular characteristics to the malt.

A process for the malting of barley has been suggested which includes the step of moistening the grain before germination with an aqueous solution or suspension of a gibberellic acid product. The expression "gibberellic acid product" includes gibberellic acid itself and functional derivatives of gibberellic acid having known plant growth promoting properties (e.g. alkali metal or alkaline earth metal salts such as the sodium, potassium or calcium salt, the ammonium salt or mono-, di-, or tri-esters).

Treatment of barley with a gibberellic acid product according to the process mentioned in the preceding paragraph accelerates the development of diastatic activity in the malting process.

It has been shown that the treatment of barley with gibberellic acid results in quicker germination and improvements in the quality of the resultant malts, such improvements being assessed by standard determinations such as those set forth in "Standard Methods of Analysis for Commercial Purposes," volume 54, pages 179–188, Journal Institute of Brewing, 1948, e.g. hot water extract, the permanently soluble nitrogen, index of modification, cold water extract, diastatic activity and so on. It has also been shown that while the results referred to are obtained when the barley is treated with giberrellic acid at the rate of 0.60 gm. per quarter (448 pounds or 203.6 kgm.) of the initial weight of the barley, improved malts are also obtained when the grain is treated with 0.02 gm. of gibberellic acid per quarter of the initial weight of the barley, although at these lower concentrations the magnitude of the effects which are achieved are reduced.

However, while it has been established that there are certain advantages arising from the treatment of barley with gibberellic acid the treatment has been found in practice to result in certain undesirable features such as:

(a) While an increase in the extent of modification of the barley (as determined, for example, by an analytical measurement of the cold water extract, permanently soluble nitrogen, index of modification and so on) is frequently associated with an improvement in the quality of the malt it is accepted that increases in the extent of modification beyond certain values are undesirable and the treatment with gibberellic acid can produce malts having too great a modification, (b) When treatment with gibberellic acid increases the cold water extract and the permanently soluble nitrogen beyond certain values malts are produced which are of undesirably high colour for the particular beers to be made, and (c) The treatment with gibberellic acid is associated during germination with an increase in the rate of respiration and in the formation of heat and difficulties are encountered in many malting houses in dissipating the heat. This difficulty is accentuated when excessive heat is developed suddenly at a particular stage of germination e.g. on the third or fourth day. Besides the difficulty referred to, the production of excessive heat may cause the malt to be modified to an undesirable extent.

An object of this invention is to provide an improved process for the malting of cereal grain involving treatment with a gibberellic acid whereby while certain at least of the advantages of this treatment are retained at least some of the disadvantages are reduced or eliminated.

According to this invention a process for the malting of cereal grain, more especially barley, comprises treating the grain in the period comprehending the pre-germination and germination stages with gibberellic acid product and with a bromate which is water soluble and which advantageously modifies the effects of the treatment with the gibberellic acid product, the proportion of said treating materials per million parts by weight of grain being 0.05 to 5 parts for said acid product and 100 to 2000 parts for said bromate.

The treatment with bromate modifies the effects of the treatment with the gibberellic acid product with the beneficial results mentioned above. It is preferred that the grain is simultaneously treated with the gibberellic acid product and with the bromate.

The grain is preferably treated with an aqueous solution of a gibberellic acid product and of the bromate. While the treatment may proceed simultaneously by the separate application of two solutions it is preferred that the gibberellic acid product and the bromate be applied to the grain as a single aqueous solution.

If the treatment is undertaken before germination it is preferably performed after steeping (e.g. as the steeped grain is being conveyed to the flooring room) although it may be undertaken during a late stage in the steeping operation. Preferably the treatment is then performed in the final steep water.

If the treatment is performed during germination it is preferred that this be done early in the germination stage and preferably the treatment is performed immediately after steeping has been completed, for instance, it is preferably arranged that the solution is sprayed on to the grain at the start of flooring. Treatment early in the germination stage is advisable to enable the desired effects to be obtained before those changes which determine the character of the malt have proceeded too far. For similar reasons the treatment with the acid and with the bromate should be at the same time or close together in time since if the effects of the acid treatment become pronounced beyond a certain value the modifying effects of the bromate treatment will be reduced or will not be obtained. The bromate treatment may follow the acid treatment by up to 24 hours but this time should not be exceeded.

The following examples will serve to illustrate the invention but are not to be regarded as limiting it in any way.

Example 1

A malting process was carried out on a malting barley of the variety Proctor of a high nitrogen content and rather low quality by the normal process referred to in the second paragraph of this specification as one of four parallel operations, the germination period being 9 days in each case. In operation A no gibberellic acid or bromate was used i.e. the operation was conventional and this serves as a control. In operation B the grain was sprayed with a solution of potassium bromate at the rate of 25 grams. of bromate in 2 gallons of water for each quarter of grain, i.e. a concentration of 100 parts by weight of bromate to initial grain weight prior to steeping and spraying. Gibberellic acid was not used in this operation. In operation C the grain was treated with .05 gram of gibberellic acid in 2 gallons of water, for each quarter of barley i.e. a concentration of 0.2 part per million, and in operation D the grain was treated with the same gibberellic acid concentration as in operation C together with the same bromate concentration as in operation B. In each of operations B, C and D the aqueous solution was sprayed on to the grain during flooring immediately after steeping. The following results were obtained.

|  | A | B | C | D |
| --- | --- | --- | --- | --- |
| Dry Extract | 97.0 | 97.9 | 98.8 | 99.3 |
| Colour | 2.0 | 2.0 | 3.5 | 2.5 |
| Cold Water Extract | 17.0 | 17.4 | 21.8 | 20.4 |
| Diastatic Power | 100 | 100 | 105 | 100 |
| Total Nitrogen | 1.76 | 1.76 | 1.79 | 1.73 |
| Permanently Soluble Nitrogen | 0.51 | 0.53 | 0.64 | 0.58 |
| Index of Modification | 29.0 | 30.0 | 35.8 | 33.5 |
| Average Flooring Temperature, °F | 66 | 66 | 69 | 65 |

The results from operation D indicate a better analytical balance than those from operation C with a reduction in the average flooring temperature. The temperature reduction compared with operation C (gibberellic acid alone) is pronounced.

*Example II*

Operations A, B C and D were performed under identical conditions to those for Example I and using another variety of barley. The following results were obtained:

|  | A | B | C | D |
| --- | --- | --- | --- | --- |
| Dry Extract | 102.2 | 103.0 | 103.8 | 103.9 |
| Colour | 2.5 | 2.5 | 10.0 | 6.0 |
| Cold Water Extract | 16.7 | 17.3 | 21.9 | 19.8 |
| Diastatic Power | 44 | 44 | 34 | 43 |
| Total Nitrogen | 1.54 | 1.51 | 1.53 | 1.53 |
| Permanently Soluble Nitrogen | 0.53 | 0.56 | 0.65 | 0.58 |
| Index of Modification | 34.2 | 37.0 | 42.5 | 37.8 |
| Average Flooring Temperature, °F | 61 | 61 | 69 | 65 |

Here also the results show that utilising gibberellic acid together with the bromate produces a better analytical balance with a reduction in the average flooring temperature compared with operation C.

*Example III*

The effect of varying the proportion of the potassium bromate to change the cold water extract and the permanently soluble nitrogen will be gathered from the four parallel operations which were conducted in each case under identical conditions, the grain of variety Proctor of a lower nitrogen content and better quality being sprayed with a solution of gibberellic acid and potassium bromate during flooring and immediately after steeping. The results of these operations (A, B, C and D) are set beside those for an operation (X) carried out under identical conditions without however using gibberellic acid and bromate—see the table below. In operation A the solution comprises .05 gram of gibberellic acid with 25 grams of bromate for 2 gallons of water, the solution being used for each quarter of barley. In operation B .05 gram of gibberellic acid was used with 37.5 grams of potassium bromate for 2 gallons of water. In operation C .05 gram of gibberellic acid was used with 50 grams of potassium bromate and finally in operation D .05 gram of gibberellic acid was used with 75 grams of potassium bromate. Thus the gibberellic acid content is constant and the potassium bromate content is progressively increased.

|  | X | A | B | C | D |
| --- | --- | --- | --- | --- | --- |
| Dry Extract | 102.4 | 103.9 | 104.0 | 103.5 | 104.2 |
| Colour | 2.0 | 2.0 | 2.0 | 2.0 | 2.0 |
| Cold Water Extract | 17.0 | 19.9 | 19.1 | 18.7 | 18.1 |
| Diastatic Power | 58 | 58 | 58 | 52 | 54 |
| Total Nitrogen | 1.55 | 1.54 | 1.52 | 1.50 | 1.51 |
| Permanently Soluble Nitrogen | 0.56 | 0.61 | 0.58 | 0.53 | 0.50 |
| Index of Modification | 36.1 | 39.6 | 38.3 | 35.3 | 33.1 |

The operations were so performed as to ensure that the average flooring temperature of each operation was the same.

*Example IV*

A malting process was carried out on a malting barley by the normal process referred to in the second paragraph of this specification as one of four parallel operations, the germination period being 9 days in each case. In operation A no gibberellic acid or bromate was used i.e. the operation was conventional and this serves as a control. In operation B the grain was sprayed with a solution of calcium bromate at the rate of 25 grams of bromate in 2 gallons of water for each quarter of grain, i.e. a concentration of 100 parts per million by weight of bromate to initial grain weight prior to steeping and spraying. Gibberellic acid was not used in this operation. In operation C the grain was treated with .05 grams of gibberellic acid in 2 gallons of water, for each quarter of barley, i.e. a concentration of 0.2 part per million, and in operation D the grain was treated with the same gibberellic acid concentration as in operation C together with the same bromate concentration as in operation B. In each of operations B, C and D the aqueous solution was sprayed on to the grain during flooring immediately after steeping. The following results were obtained.

|  | A | B | C | D |
| --- | --- | --- | --- | --- |
| Dry Extract | 96.7 | 100.2 | 98.5 | 100.4 |
| Colour | 2.0 | 2.0 | 3.0 | 2.5 |
| Cold Water Extract | 14.6 | 15.8 | 17.8 | 17.2 |
| Diastatic Activity | 38 | 48 | 52 | 60 |
| Total Nitrogen | 1.64 | 1.64 | 1.61 | 1.60 |
| Permanently Soluble Nitrogen | 0.48 | 0.49 | 0.56 | 0.53 |
| Index of Modification | 29.3 | 29.9 | 34.7 | 33.1 |

The results from operation D indicate a better analytical balance than those from operation C.

*Example V*

The effect of varying the concentrations of the gibberellic acid and the calcium bromate will be gathered in conjunction with Example IV from the following additional operations which were conducted in each case under identical conditions, the grain being sprayed with a solution of gibberellic acid and calcium bromate during flooring and immediately after steeping.

In operation B' the solution comprises 50 grams of bromate in 2 gallons of water for each quarter of grain, i.e. a concentration of 200 parts per million of bromate to grain, no gibberellic acid being used. In operation C' the grain was treated with 0.1 gram of gibberellic acid in 2 gallons of water for each quarter of barley, i.e. a concentration of 0.4 part per million. In operation D' the grain was treated with the same gibberellic concentration as in operation C' together with the same bromate concentration as in operation B of Example I.

|  | B' | C' | D' |
| --- | --- | --- | --- |
| Dry Extract | 99.6 | 99.8 | 101.2 |
| Colour | 2.0 | 5.0 | 3.0 |
| Cold Water Extract | 15.8 | 18.2 | 17.4 |
| Diastatic Activity | 52 | 54 | 60 |
| Total Nitrogen | 1.62 | 1.60 | 1.65 |
| Permanently Soluble Nitrogen | 0.46 | 0.59 | 0.54 |
| Index of Modification | 28.4 | 36.9 | 32.7 |

The operations in both Examples IV and V were so performed as to ensure that the average flooring temperature of each operation was the same.

Examples have been given of the use of potassium and calcium bromate and reference has also been made to sodium bromate. The latter is equally effective. The invention has broad application to water-soluble metallic-salt bromates the cations of which (at the concentrations specified by the invention) are not detrimental to the brewing process. Thus, besides the bromates referred to ammonium, magnesium and lithium bromate may be effectively used.

We have previously proposed to malt grain, especially barley, in which the grain is treated at the germination stage, or prior thereto, with an aqueous liquor containing 100 to 2000 parts per million of potassium or sodium bromate. This process is disclosed in detail in United States Patent No. 2,960,409. The treatment with bromate is directed to reducing the malting loss in comparison with that obtained in conventional malting processes.

Unexpectedly it has now been found that by treating the grain with bromate the disadvantages of the treatment with gibberellic acid as referred to above, are reduced or eliminated while retaining at least some of the desirable features of the treatment with the acid. Thus, the dry extract is substantially the same compared with treatment by gibberellic acid alone while at the same time the cold water extract and the permanently soluble nitrogen are restored to acceptable values and the colour formation on kilning is not undesirably high. This result is surprising because both the bromate and gibberellic acid tend to increase the cold water extract and also the permanently soluble nitrogen whereas the use of the acid together with the bromate results in values which are lower than those obtainable with gibberellic acid alone.

Furthermore the reduction of the cold water extract and the permanently soluble nitrogen is accomplished without loss of the hot water extract.

The balance between cold water extract and the permanently soluble nitrogen can readily be varied by changing the relative proportions of the gibberellic acid and the bromate which is used. The variation in the balance is achieved without loss of the hot water extract.

In commercial practice the normal minimum quantity of gibberellic acid product required to produce significant effects is .015 gram for each quarter of barley (initial weight) and for this 5 grams of bromate are required. Preferably .05 gram of acid is used the bromate being about 25 grams. The quantity of acid product may be increased from the quoted values but the quantity of acid product used should be the minimum which will produce the effects required and correspondingly the quantity of bromate should be the minimum to counteract the undesirable effects of the acid.

The quantity of water for the solution is variable within wide limits. The solution should be sufficient to treat all the grains without excess loss of the liquid to drain since this represents a loss of the acid product and of the bromate. About ½–2 gallons of water for each quarter of grain, depending on conditions, is normally suitable when the grain is sprayed with the aqueous solution.

Instead of spraying the floored grain after steeping has been completed as in the above examples, the grain may be similarly treated with the gibberellic acid product and bromate but in the steep water, preferably the final steep water. In that case however, it is found that the required concentrations of the bromate and of the gibberellic acid in relation to the grain are approximately five times those required using the spraying technique as in the above examples.

The quantities of gibberellic acid product and bromate which may be used (and within which the above examples fall) is, for the acid product, with respect to the initial weight of grain between 0.05 and 5.0 parts per million and, for the bromate, again with respect to the grain between 100 and 2000 parts per million.

We claim:

1. A process for the malting of cereal grain which comprises treating the grain in the period covering the pre-germination and germination stages with gibberellic acid product and with a bromate in the proportion per million parts by weight of grain of 0.05 to 5 parts of said acid product and 100 to 2000 parts of said bromate, said bromate being selected as being water-soluble to provide the bromate anion reducing respiration rate and exhibiting rootlet inhibiting properties reducing the malting loss whilst providing a cation which at the specified concentration is not detrimental to the brewing process, and to modify the effect of the treatment with said gibberellic acid product by counteracting the otherwise increased values of the cold water extract and the permanently soluble nitrogen.

2. A process according to claim 1 wherein said bromate is selected from the group consisting of sodium bromate and potassium bromate.

3. A process according to claim 1 wherein said bromate is selected from the group comprising ammonium, calcium, lithium and magnesium bromate.

4. A process for the malting of cereal grain which comprises providing an aqueous solution having dissolved therein gibberellic acid and a bromate selected from the group consisting of potassium and sodium bromate in a proportion of 0.05 to 5 parts of the acid to between 100 and 2000 parts of bromate and contacting cereal grain with said solution after steeping of the grain and in the period covering the pre-germination and germination stages, a quantity of solution being used to provide 0.05 to 5 parts of acid and 100 to 2000 parts of bromate per million parts of grain.

5. A process for the malting of cereal grain which comprises providing an aqueous solution having dissolved therein gibberellic acid and a bromate selected from the group consisting of ammonium, calcium, lithium and magnesium bromate in a proportion of 0.05 to 5 parts of the acid to between 100 and 2000 parts of bromate and contacting cereal grain with said solution after steeping of the grain and in the period covering the pre-germination and germination stages, a quantity of solution being used to provide 0.05 to 5 parts of acid and 100 to 2000 parts of bromate per million parts of grain.

6. A process for the malting of cereal grain which comprises:
   (a) steeping cereal grain, then
   (b) conveying the steeped grain to a flooring area and
   (c) as the grain is being conveyed, spraying it with an aqueous solution of gibberellic acid product and a bromate selected from the group consisting of ammonium, calcium, lithium, magnesium, potassium and sodium bromate, and
   (d) the proportion of solution to grain being such that each one million parts of grain contact between 0.05 and 5 parts of said acid product and between 100 and 2000 parts of said bromate.

7. A process for the malting of cereal grain which comprises:
   (a) steeping cereal grain,
   (b) contacting the steeped grain with gibberellic acid product in a ratio of 0.5 to 5 parts of said acid product per million parts of grain,
   (c) contacting the steeped grain with a bromate selected from the group consisting of ammonium, calcium, lithium, magnesium, potassium and sodium bromate, in a ratio of 100 to 2000 parts of bromate per million parts of grain,
   (d) said contacting with bromate being within up to 24 hours of said contacting with the gibberellic acid product.

8. A process for the malting of barley grain which comprises:
(a) steeping barley grain,
(b) removing the grain from the steeping liquor,
(c) spraying the steeped grain with an aqueous solution containing in each 2 gallons thereof about 0.05 gram of gibberellic acid and about 25 grams of a bromate selected from the group consisting of sodium bromate, potassium bromate and calcium bromate, and
(d) germinating the grain,
(e) the amount of solution used in the step (c) being such that each million parts of grain is contacted with between about 0.05 and 5 parts of gibberellic acid and between about 100 and 2000 parts of bromate.

9. A process according to claim 1 in which the grain is simultaneously treated with said gibberellic acid product and with said bromate.

10. A process according to claim 9 in which the grain is treated with an aqueous solution of said gibberellic acid product and the said bromate.

11. A process according to claim 10 in which the grain is treated in the final steep water of a steeping step.

12. A process according to claim 10 in which said solution is applied to the grain immediately after a steeping of the grain has been completed.

13. A process according to claim 10 in which said solution is sprayed onto the grain during flooring.

References Cited by the Examiner
UNITED STATES PATENTS 3,014,847  12/61  Kneen et al. _____ 195—70
3,104,207  9/63   Brian et al. _____ 195—70

A. LOUIS MONACELL, *Primary Examiner.*